G. HANCOCK.

Sewing-Machine.

No. 8,178. Reissued April 16, 1878.

Witnesses

D. V. Briesen

John C. Tunbridge.

Inventor:

Geo. Hancock by his attorney

A. V. Briesen

N. PETERS, PHOTO-LITHOGRAPHER, WASHINGTON, D. C.

UNITED STATES PATENT OFFICE.

GEORGE HANCOCK, OF PASSAIC, NEW JERSEY.

IMPROVEMENT IN SEWING-MACHINES.

Specification forming part of Letters Patent No. 168,989, dated October 19, 1875; Reissue No. 8,028, dated January 8, 1878; Reissue No. 8,178, dated April 16, 1878; application filed March 2, 1878.

*To all whom it may concern:*

Be it known that I, GEORGE HANCOCK, formerly of Providence, in the county of Providence and State of Rhode Island, but now of Passaic, in the county of Passaic and State of New Jersey, have invented certain new and useful Improvements in Sewing-Machines; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to improved mechanism for operating the shuttle of a sewing-machine from the same shaft which operates the needle, the object being to render the operation of the machine noiseless, and capable of simple and cheap reparation from the effects of wear; and my invention, for this purpose, consists of a combination of an eccentric and strap on the driving-shaft, and a sliding connection between the same and a vertical lever, and also of a universal and adjustable joint or connection between the actuating end of the said lever and another horizontal lever that operates the shuttle beneath the table of the machine, so that the rapid changes of motion may take place without noise and without excessive wear of the parts, provision being, however, made for repairing wear of the parts at small expense.

Figure 1:
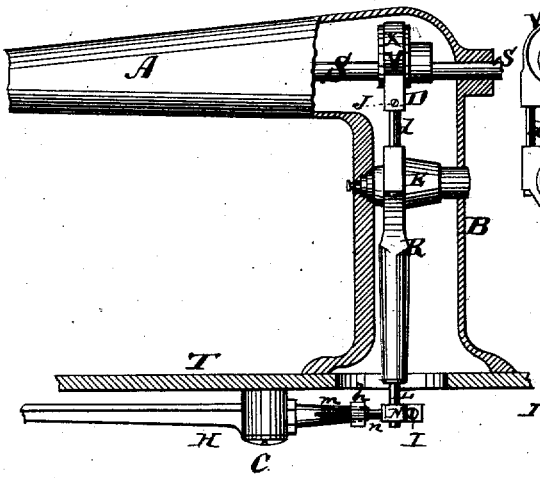
Figure 2:
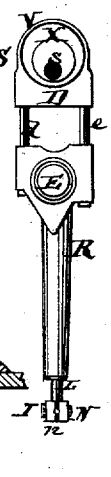
Figure 4:
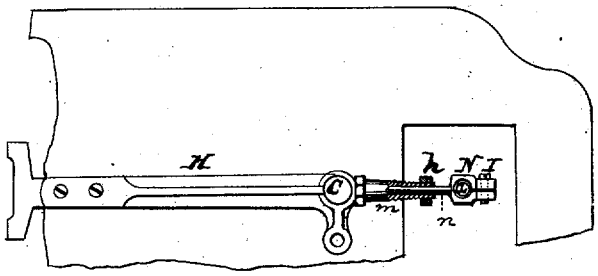
Figure 3:
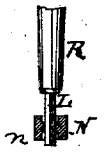

Referring to the drawings, Figure 1 is an elevation and section of the frame of a sewing-machine, showing the mechanism which constitutes my said improvement. Fig. 2 is a rear elevation of the said mechanism separately. Fig. 3 is an elevation and a cross-section of the parts at the lower end of Fig. 2. Fig. 4 is a bottom view, partly in section, of the mechanism in Fig. 1.

Similar letters of reference indicate like parts in the several figures.

Fig. 1 of the drawings shows the improved mechanism arranged with a vertical section of the sewing-machine-table T, and upright B and arm A, in which the shaft S has bearings, and operates the needle-bar at the front of the machine in the usual manner. An eccentric, X, is secured on this shaft, with a surrounding strap, V, extending from a block, D, beneath, in which block are secured two rods, *d* and *e*. These rods extend into sockets in the upper part of the vertical lever R, which is pivoted at E in the upright B of the machine-frame. The said rods slide in said sockets, and form a sliding connection adapted to convert the rotary movement of the said eccentric into the vibratory movement of the vertical lever. The lower end of the said lever is formed with a pivot, L, which forms part of a universal joint or connection with the contiguous end of the horizontal lever H, which is pivoted at C to the under side of the table, and drives the shuttle at the opposite end K. The said universal joint beside the pivot L of the lever R comprises a split socket, N, which is applied to the end of the horizontal lever H. This socket is formed by splitting the end of a rod or pin, *n*, and perforating said pin crosswise, the perforation being parallel to the split, as indicated in Fig. 4. A set-screw, I, extends across the split part of the pin or rod. The pivot L enters the aperture of said split pin or rod, as shown in Fig. 3, and the screw I serves to adjust the sides of said pin *n* against said pivot L in proper manner, and to compensate for the wear of the parts. The aperture in the pin *n* for the reception of the pivot L is made with a V-shaped or nearly V-shaped bearing-surface against said pivot, as shown in Fig. 3.

The pin *n* extends into a hollow sleeve, *m*, that forms the end of the horizontal lever H. Said sleeve is split, as shown in Fig. 1, and tapering on the outer side, and threaded to receive a nut, *h*, as shown in Fig. 4. By means of said nut the tapering sleeve *m* can be compressed against the pin *n* to hold the latter in place.

By the construction and arrangement of the several parts, as described, the rotary movement of the eccentric X on the main shaft is transmitted freely and positively to the upright lever R, and the vibratory movement thereby produced is transmitted to the horizontal shuttle-lever H, through the connection at the junction of the two levers, as described, by means of which all loss of movement is provided for, and, besides, means are provided to take up the parts and prevent loss of movement that is produced by the use and wear of said parts.

The two rods *d* and *e* are secured in the block D of the eccentric-strap by set-screws J, Fig. 1; and said rods are simply lengths of round steel wire, which, when completely worn, can be replaced by new ones at very slight expense; and before such replacement becomes necessary the rods may be turned in the sockets, when they have become worn, and a fresh surface presented to sustain the wear.

It will also be seen that, from the construction and arrangement of the said connection, the rapid reciprocating movement of the parts is rendered entirely noiseless, even when perceptibly worn.

Having thus described my invention, what I claim as new, and desire to secure by Letters Patent, is—

1. In a sewing-machine, the combination of the lever R, having pivot L, with the split clasping-socket N applied to the lever H, which socket grasps said pivot and is adjustable thereto through the medium of the set-screw I, substantially as and for the purpose specified.

2. In a sewing-machine, the combination of the vertical lever R, provided with the pivot L, with the lever H, having the clasping-socket N, and with the block D, provided with the rods *d* and *e*, and the eccentric strap V, overlapping the eccentric X, substantially as and for the purpose set forth.

3. In a sewing-machine, the combination of the lever H, having split tapering sleeve *m*, with the split pin *n*, having socket N, and with the nut *h* and lever R, provided with the pivot L, substantially as herein shown and described.

GEORGE HANCOCK.

Witnesses:

WILLIAM HENDRY,

T. B. MOSHER.